(12) United States Patent
Rijavec et al.

(10) Patent No.: US 7,043,086 B2
(45) Date of Patent: May 9, 2006

(54) JPEG PACKED BLOCK DATA STRUCTURE FOR ENHANCED IMAGE PROCESSING

(75) Inventors: Nenad Rijavec, Longmont, CO (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 09/896,110

(22) Filed: Jul. 2, 2001

(65) Prior Publication Data

US 2003/0048952 A1 Mar. 13, 2003

(51) Int. Cl.
*G06K 9/36* (2006.01)

(52) U.S. Cl. ...................................... 382/232

(58) Field of Classification Search ............... 382/232, 382/233; 380/28, 37, 42, 44; 713/168, 171, 713/189, 200, 201
See application file for complete search history.

(56) References Cited

U.S. PATENT DOCUMENTS

| | | | | |
|---|---|---|---|---|
| 5,805,914 A | * | 9/1998 | Wise et al. | 382/232 |
| 6,182,216 B1 | * | 1/2001 | Luyster | 713/168 |
| 6,199,162 B1 | * | 3/2001 | Luyster | 713/168 |
| 6,578,150 B1 | * | 6/2003 | Luyster | 713/200 |
| 6,751,319 B1 | * | 6/2004 | Luyster | 380/37 |

* cited by examiner

*Primary Examiner*—Jose L. Couso
(74) *Attorney, Agent, or Firm*—Whitham, Curtis, Christofferson, & Cook, PC; Dale M. Crockatt

(57) ABSTRACT

An intermediate data format which is readily convertible to or from JPEG compliant data streams and to or from image data provides, in most circumstances, accelerated encoding and decoding in a degree sufficient to allow additional processing without necessitating increase of processor power even in relatively time-critical applications such as high-speed printers and image browsers. The format features flags which indicate if S>8 (indicating that extra bits are required to uniquely encode an orthogonal transform coefficient value) or runs of zero-valued orthogonal transform coefficients longer than sixteen are present in a block of data. The block of data can be tested for these conditions and flags set once per block or once per image. Extensive processing can thus be omitted if either or both of these conditions are not present, as will generally be the case.

6 Claims, 2 Drawing Sheets

JPEG PACKED BLOCK DATA STRUCTURE FOR ENHANCED IMAGE PROCESSING

CROSS-REFERENCE TO RELATED APPLICATIONS

This application is related to U.S. patent applications Ser. No. 09/736,444, now U.S. Pat. No. 6,757,439, and Ser. No. 09/736,445, now U.S. Pat. No. 6,373,412, both filed Dec. 15, 2000, entitled JPEG Packed Block Structure and Fast JPEG Huffman Coding and Decoding, respectively, and U.S. patent application Ser. No. 09/896,117, entitled Faster Lossless Rotation of JPEG Images, filed concurrently herewith, all of which are assigned to the assignee of the present application and hereby fully incorporated by reference.

BACKGROUND OF THE INVENTION

1. Field of the Invention

The present invention generally relates to image data compression and image data processing and, more particularly, to compression of image data in accordance with JPEG, MPEG or other image data standards in connection with reconstruction or other processing of information such as for merge, shift, rotation and the like.

2. Description of the Prior Art

Pictorial and graphics images contain extremely large amounts of information and, if digitized to allow transmission or processing by digital data processors, often requires many millions of bytes to represent respective pixels of the image or graphics with good fidelity. The purpose of image data compression is to represent images with less data in order to save storage costs or transmission time and costs. The most effective compression is achieved by approximating the original image, rather than reproducing it exactly. The JPEG standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and opens up the capability to provide digital continuous-tone color images in multi-media applications.

JPEG is primarily concerned with images that have two spatial dimensions, contain gray scale or color information, and possess no temporal dependence, as distinguished from the MPEG (Moving Picture Experts Group) standard which additionally exploits redundancy between frames for additional compression to meet motion picture and/or television frame rate demands. The JPEG standard has been developed as a flexible system for potentially providing the highest possible image fidelity for a given amount of data while allowing the amount of data representing the image to be reduced by a substantially arbitrary factor. The JPEG standard also allows substantial exploitation of relative sensitivities and insensitivities of human visual perception and it is not unusual for the JPEG standard to allow image data compression by a factor of twenty or more without significant perceptible image degradation.

At the same time, virtually no constraints are placed on processor resources or data processing methodologies so that improvements therein that result in reduced processing time will allow increased throughput and additional processing to be achieved in environments such as high speed printers where the printer will eject blank pages if the next complete page is not ready. Nevertheless, substantial data processing is required for encoding and decoding, particularly due to the need for statistical analyses of converted image values (e.g. discrete cosine transform (DCT) coefficients) in order to assure substantial data compression in accordance with the concept of entropy coding.

The concept of entropy coding generally parallels the concept of entropy in the more familiar context of thermodynamics where entropy quantifies the amount of "disorder" in a physical system. In the field of information theory, entropy is a measure of the predictability of the content of any given quantum of information (e.g. symbol) in the environment of a collection of data of arbitrary size and independent of the meaning of any given quantum of information or symbol.

This concept provides an achievable lower bound for the amount of compression that can be achieved for a given alphabet of symbols and, more fundamentally, leads to an approach to compression on the premise that relatively more predictable data or symbols contain less information than less predictable data or symbols and the converse that relatively less predictable data or symbols contain more information than more predictable data or symbols. Thus, assuming a suitable code for the purpose, optimally efficient compression can be achieved by allocating fewer bits to more predictable symbols or values (that are more common in the body of data and include less information) while reserving longer codes for relatively rare symbols or values.

By the same token, however, the JPEG standard and other image data compression standards have substantially no implications in regard to efficiency of data processing for encoding, decoding or other desired image manipulations beyond those expected from alteration of the volume of data to be processed, transmitted or stored. On the contrary, the very flexibility of coding provided by the JPEG standard requires substantial processing to determine details of the manner in which data is to be decoded, particularly in regard to portions of the coded data which represent variable length codes necessary to efficient data compression in accordance with the principles of entropy coding.

It has been found that some processing is, in fact, complicated by some intermediate data formats which are compatible with entropy encoding into the JPEG standard but not others which are similarly compatible. These standards specify the data streams but not the intermediate formats.

It should also be appreciated that image data compression standards such as the JPEG standard are principally directed toward facilitating exploitation of the trade-off between image fidelity and data transmission and processing time or required storage capacity. However, at the current time, some applications such as high performance printers and image browsers place high demands on both image fidelity and rapid data conversion. For example, high resolution color printers are foreseeable having such high printing speed that processing power at or exceeding the limits of current practicality is required. Such applications may also require additional processing such as image rotation or size change prior to image decoding for which, as a practical matter, no time is available.

Further, it should be appreciated that some loss of fidelity is unavoidable due to the quantization of image data for digital processing. Therefore, coding and decoding is, to some degree, lossy. This lossiness is acceptable for a single coding and decoding process since the nature of quantization can be freely chosen. However, multiple coding and decoding processes which may be necessitated by a need to perform certain image manipulations, such as rotation, on decoded data (that must again be encoded and decoded for efficient processing and storage and acceptable data processing time to reconstruct the image) generally cause substantial and readily perceptible image degradation.

SUMMARY OF THE INVENTION

It is therefore an object of the present invention to provide a digital intermediate data format which is JPEG compatible which allows reduced processing time for decoding.

It is another object of the invention to provide a digital data intermediate format which is JPEG compatible which facilitates execution of DCT domain image processing algorithms.

It is a further object of the invention to provide a JPEG compatible digital data format which may be decoded in a simplified and consistent manner without imposing significant limitation on image fidelity or significant decrease in compression efficiency.

In order to accomplish these and other objects of the invention, a method of coding image data is provided including the steps of testing for coefficient values requiring more than eight bits to be uniquely coded, and using a flag in at least one block of data to indicate if all coefficient values in the block are coded in eight bits or fewer or if any requires more than eight bits to be uniquely coded.

In accordance with another aspect of the invention, a data format is provided including a first pair of bytes representing a block number, a Klast value and at least one flag indicating if all said coefficient values in said block are coded in eight bits or fewer or if any requires more than eight bits to be uniquely coded, and a second pair of bytes respectively representing an R/S value and a coefficient value.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
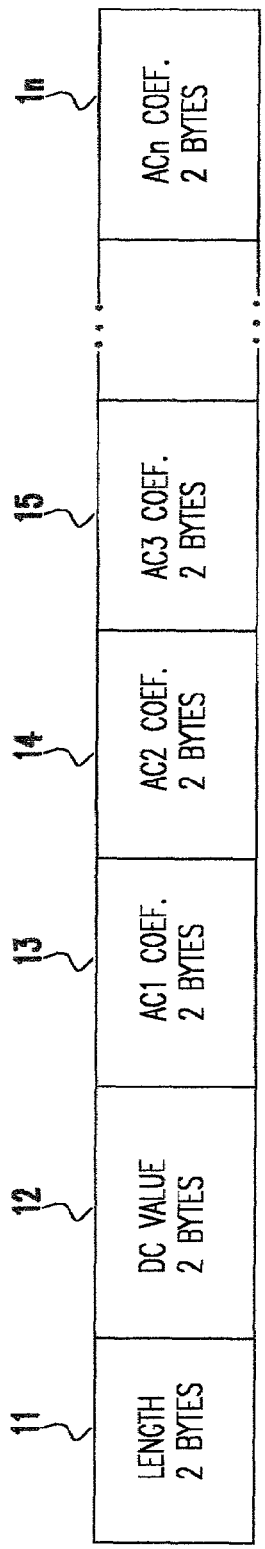
FIG. 1 is a schematic depiction of a data format for digital quantized transform coefficients compatible with the JPEG standard.

Referring now to the drawings, and more particularly to FIG. 1, there is shown a schematic depiction of a JPEG compatible intermediate data format for a block of quantized transform coefficients for use in the IBM JPEG Express code which was developed to simplify processing in high performance requirement products such as high-speed printers and internet browsers. As is well-understood in the art, an image is digitized by first dividing the entire image into areas which can be thereafter processed as blocks. The blocks are preferably subdivided into a matrix of areas of preferably 8×8 areas or cells.

The image values (e.g. color, intensity, etc. in accordance with any image value or color coordinate system) are then quantized and a data transformation is performed such as a discrete cosine transformation (DCT) which provides values which are more easily compressed. For example, a DCT provides a number of DCT coefficients which are equal in number to the number of samples which make up the image block but many of the coefficients will be zero or near zero. After quantization, the near-zero coefficients will be zero. If these quantized coefficients are reordered into a so-called zig-zag order (of approximately increasing or decreasing spatial frequency in both the horizontal and vertical directions) such zero quantized values will often be grouped together in accordance with relative sensitivity of human perception. These groups or runs of zero or near zero values which can be expressed in very few bits or bytes which allows substantial data compression while minimizing the perceptibility of loss of image fidelity.

The data structure of FIG. 1 stores the DCT quantized coefficients in zig-zag scan order as two bytes per coefficient. Each coefficient up to the end of block signal is assigned two bytes. The leading two bytes 11 is a length field to define the number of bytes in the DCT block, from which the EOB can be calculated and need not be separately provided. The DC coefficient 12 and AC coefficients 13, 14, . . . 1n are represented by two bytes each but not all AC coefficients need be included if the value of higher spatial frequency AC coefficients are zero or sufficiently near-zero. The variable number of bytes in a block can thus yield substantial compression by truncation of zero quantized DCT coefficients of the higher spatial frequencies. Alternatively, the length field 11 can be split into a byte length and another byte for the EOB position.

This format, when used for the JPEG compatible code in demanding applications has proved to be inefficient since the necessity of loading zero valued coefficients and test for non-zero values is computationally too expensive for the speeds demanded of these applications. By having to load and store many zero-valued coefficients, cache misses were induced, leading to an increase in the number of memory accesses and increased processing burden. The magnitude of this burden and avoidable memory hardware and operational requirements may be appreciated from the fact that many blocks have five or fewer non-zero coefficients.

Figure 2:
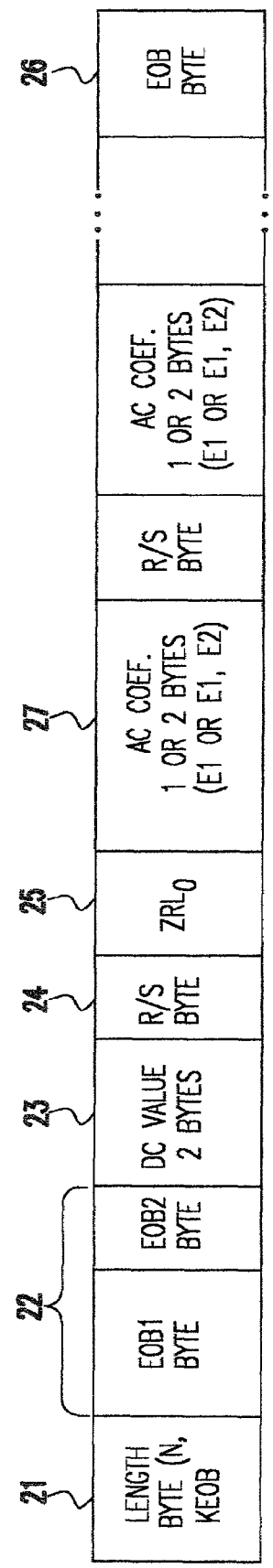
FIG. 2 is a schematic depiction of a packed block data format as disclosed in the above-incorporated U.S. patent application 09/736,445, (U.S. Pat. No. 6,373,412)

Referring now to FIG. 2, a JPEG compatible packed block format as disclosed in the above-incorporated application Ser. No. 09/736,444, now U.S. Pat. No. 6,757,439 (JPEG Packed Block Structure is shown. Each DCT block starts with a length byte 21 followed by two bytes 22 to save the location of the EOB for sequential coding and the current EOB for progressive coding. The quantized DC coefficient 23 is stored in the next two bytes/sixteen bits. This may be represented as either the actual DC coefficient value or the difference in DC coefficient from the previous block (e.g. as a prediction). However, the former is generally preferred when further DCT domain processing is anticipated to render the blocks (and their order) self-contained and independent of each other. On the other hand, where the purpose of the format is to save the information while statistics are being accumulated (e.g. for generating custom Huffman tables, saving the DC coefficient value as the prediction (not shown in FIG. 1) converted into an S byte followed by the one or two bytes of extra bits will minimize later processing. It is possible to use both formats simultaneously.

Each non-zero AC coefficient is stored in two or more bytes. The first byte 24 is the R/S byte used for Huffman encoding, (i.e. the high order nibble R=four bits) equals the run of zero-valued AC coefficients in zig-zag order up to fifteen and the low order nibble S= four bits) is the number of extra bits necessary to uniquely code the non-zero magnitude. A preferred form of this packed format stores the extra bits in the next one or two bytes (e.g. E1 or E1 and E2) 25, depending on whether or not the second byte is needed (i.e. S>8) That is, E2 is an optional second byte which is only needed if S>8. The EOB byte is used if EOB1>64. Since the ZRLs and E2 are data dependent, data is accessed one byte at a time. An alternative implementation always follows the R/S byte with the actual AC coefficient value in two bytes. The final byte is the symbol 0x00 which indicates that an EOB is to be coded. ZRL is a byte 27 of the form 0xF0 used when the run of zero coefficients is greater than 15.

While both of the data formats of FIGS. 1 and 2 were developed to provide certain enhancements in the context of certain processing functions for image data and are effective to do so, neither is optimal for some fundamental image data processing requirements, such as decoding, or some relatively ubiquitous image manipulations, such as rotation by multiples of 90°. Specifically, the data format of FIG. 1 allows compression only by truncation of the terminal/high spatial frequency zero valued quantized coefficients and is therefore inefficient in processor and memory utilization as alluded to above. The packed data format of FIG. 2 requires multiple tests per block, possibly as many as sixty-three, to be carried out to determine the number of non-zero AC coefficients to be encoded or otherwise processed. Further, responsive to such tests, the image data must be synchronized to the number of bytes actually used for each ZRL or DCT coefficient.

Figure 3:
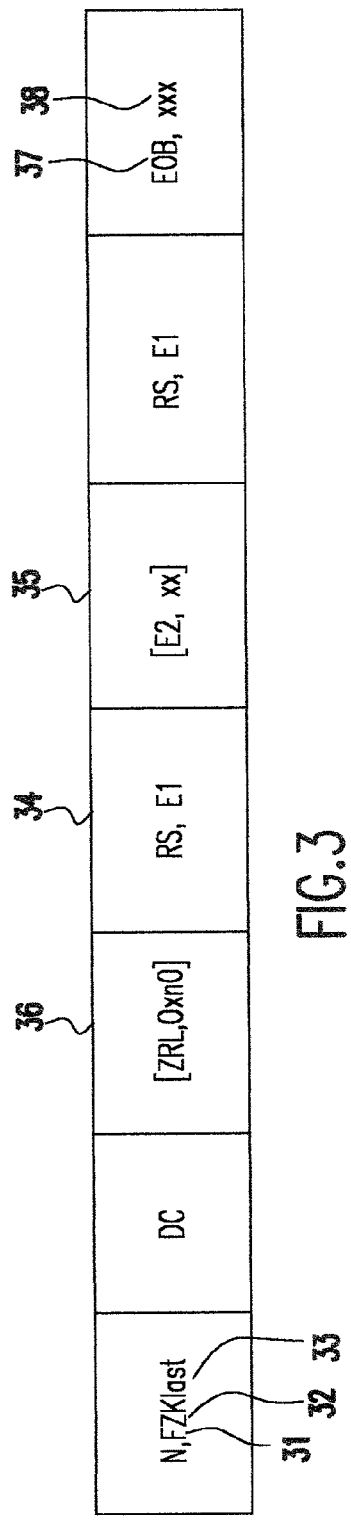
FIG. 3 is a schematic depiction of an improved packed block data format in accordance with the present invention.

Referring now to FIG. 3, the improved JPEG packed block structure in accordance with the invention is shown. In essence, this format allows determination and flagging on a per block basis whether any extra bytes were used for the coefficients (E2s) or whether any ZRLs occurred. If not, the AC coefficients stay synchronized as half words and the tests and related code to determine if the next byte is a ZRL or if the size is greater than eight (requiring an extra byte to be appended) are unnecessary. Further, by rounding all block lengths up to even or four byte boundaries, the AC coefficients can be accessed as halfwords or words and not necessarily only by bytes as was preferred to facilitate synchronization although requiring greater numbers of memory accesses. This reduces by a factor of two or four the number of reads and writes needed to access the coefficient information in packed format while simplifying the code.

The data format illustrated in FIG. 3 requires that the number of bytes in the block (i.e. the number of starts and stops at word boundaries) be a multiple of four. The EOB1 variable of FIG. 2 is replaced by a new variable FZKlast composed of a flag bit, F (31), indicating that there is at least one S (34) value greater than eight in the block (indicating presence of and need to decode an E2, 35), a flag bit, z (32), indicating that there is at least one ZRL (36) in the block and the remaining six bits (Klast) 33 give the index of the last non-zero quantized coefficient. The relationship between EOB1 and Klast is EOB1=Klast+1. EOB1 was defined as the first zero coefficient in the final run of all zero coefficients. Klast is defined as the last non-zero coefficient. In addition, the EOB byte 37 is always appended and padded with padding bytes 38 to a word boundary. Optionally, these padding bytes can be of the form 0x01, 0x02, 0x03 so the final byte in the block shows exactly how many padding bytes were used.

Figure 4:
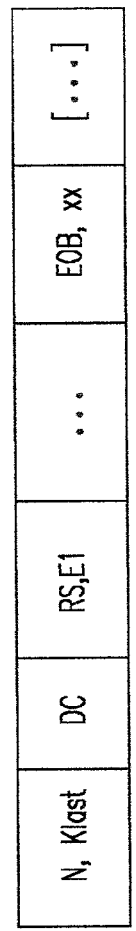
FIG. 4 is a schematic depiction of a simplified form of an improved packed block data format in accordance with the invention.

For those blocks in which there are no E2s or ZRLs, the data format of FIG. 3 simplifies to the data format shown in FIG. 4. Note that in this case, FZKlast will be 00Klast and each AC coefficient will be represented by an R/S byte where S is less than or equal to eight and the R value represents a zero value run length of less than sixteen AC coefficients. The byte 0x01 after the EOB byte can contain an arbitrary value. For reasonable Q values, this is the most common case and the non-zero bytes are pairs of bytes on two-byte boundaries. It can be understood that the data format of FIG. 4 will be prevalent since the concept of entropy coding provides that only the most rare DCT values will require coding using more than one byte.

In addition, for the case where there are ZRLs (R>15), the ZRLs can be made to fit in two bytes, preserving synchronism, instead of one, two or three bytes. The format of FIG. 2 preferably used the actual symbols 0xF0 and each symbol used indicated a Huffman code. An optional addition to the format of FIGS. 3 and 4 is to always use two bytes for the ZRL code; using the first byte for the symbol 0xF0 and the second byte for the run. Alternatively, the second byte could be the number of ZRLs in the block:

| FIG. 2 | Length (bytes) | FIG. 3 | Length (bytes) |
|---|---|---|---|
| 0xF0 | 1 | 0xF010 | 2 |
| 0xF0F0 | 2 | 0xF020 | 2 |
| 0xF0F0F0 | 3 | 0xF030 | 2 |

The preferred embodiment for the packed format in accordance with the invention is to make the coefficients fit into two or four bytes rather than two or three bytes to guarantee maintaining two byte synchronism. Some ways to pack two or four bytes are:

| FIG. 2 | Length | FIG. 3 | Length |
|---|---|---|---|
| R/S, E1 | 2 | R/S, E1 | 2 |
| R/S, E1, E2 | 3 | R/S, E1, XX, E2 | 4 |
| | | R/S, E1, E2, XX | 4 |
| | | R/S, XX, E1, E2 | 4 |

Figure 5:
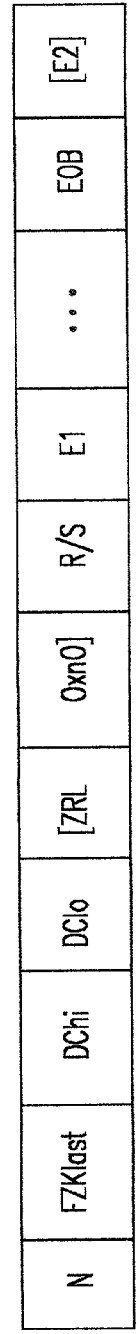
FIG. 5 is a schematic depiction of an alternative form of the improved packed block data format in accordance with the invention.

An alternative way to pack the bytes and keep the coefficients on halfword boundaries is to take the E2 byte and store it in reverse order at the end of the packed block buffer after the EOB and any padding bytes. In this case, the size of the block itself does not increase and the additional E2 bytes will equal the number of times S>8 occurred as shown in FIG. 5.

It should be appreciated that the use of the above format of FIGS. 3 and 4 in accordance with the invention may involve one test per block to determine the presence of either ZRLs or E2s in a direct conversion operation performed on each data block. While this represents a major reduction in the processing burden in contrast with other JPEG compatible data formats, even this much reduced amount of testing may be further reduced by a very large factor. Specifically, the quantization tables and the custom Huffman tables may be examined once per image (and in a timeslot outside the block data processing time since these tables are separately generated and transmitted) to determine if the decoder would ever need to look for an extra coefficient byte, thus making possible simpler code and the use of smaller tables (since fewer values would require decoding by reference thereto).

The packed JPEG structure can optionally store the R/S symbol as an S/R symbol with the R and S nibbles interchanged. The R (run) can and does have any value from 0 to 15 while the S may be limited in its range depending on the Q-values used. Also the S symbol rapidly decreases in its likelihood of occurrence as the size increases so caching may be improved with the opposite order. The entropy decoder can simply generate the reversed order if this variation is desired.

Exemplary pseudocode to test for S>8 in the Huffman tables is:

Inside Huffman marker code processing subroutine when pointing to R/S bytes should know the sum of the 16 Li terms which is the number of R/S bytes for that table.

For all Huffman tables have a flag,

```
char sGT8;              /* byte that flags if S>8    */
char RS[256]:           /* buffer with RS bytes      */
int num:                /* number of RS bytes        */
If class=1;             /* if Huffman AC table       */
    sGT8=0;             /* preset to S<9             */
    num = sum;          /* number of RS bytes        */
    do while num>0;     /* loop to look at RS bytes  */
                        /* start with last RSs first */
        num-=1          /* decrement index           */
        if(RS(num)AND 0x0f)>8
                        /* if S>8                    */
            sGT8=0x80   /* set bit                   */
            break       /* found one                 */
        endif           /* endif S>8                 */
    enddo;              /* end of loop to look at RS */
endif                   /* endif AC Huffman table    */
```

The remainder of the code can know from this flag that S>8 is impossible and paths can then be followed which never test for such a condition.

In view of the foregoing, it is seen that the intermediate data format in accordance with the invention provides for reduced numbers of memory calls by allowing word or half word accesses and much reduced processing while synchronization is maintained. On average, the memory accesses for any given image will be reduced by a factor of about two, generally allowing time for other processing that may be desired such as image rotations and the like without requiring more processing power than is currently economically feasible. Additionally, the improved packed block structure is compatible with and will provide similar advantages with at least the MPEG-1, MPEG-2, H.261 and H.263 video standard which all use 8×8 blocks of a single component.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of coding image data into at least one block of data including a plurality of coefficient values, said method including the steps of testing said coefficient values for coefficient values requiring more than eight bits to be uniquely coded, and using a flag in said at least one block of data to indicate if all said coefficient values in said block are coded in eight bits or fewer or if any coefficient value requires more than eight bits to be uniquely coded.

2. A method as recited in claim 1 wherein said coefficient values are DCT coefficients.

3. A method as recited in claim 2 wherein said DCT coefficients are AC DCT coefficients.

4. A method as recited in claim 1, wherein said testing step is performed once per image.

5. A method as recited in claim 1, wherein said testing step is performed once per block.

6. A method as recited in claim 1 including the further step of using another flag in a block of data to indicate if any ZRLs are present.

* * * * *